(12) United States Patent
Heron et al.

(10) Patent No.: US 11,102,101 B2
(45) Date of Patent: *Aug. 24, 2021

(54) IN-VEHICLE SERVICES THROUGH ATTENDANT DEVICES, USER-PROVIDED DEVICES, AND/OR AN IN-VEHICLE COMPUTER SYSTEM

(71) Applicant: Kwivo, LLC, Brooklyn, NY (US)

(72) Inventors: Alexandra Kathleen Heron, Brooklyn, NY (US); Julio Toro Silva, Panama (PA); Manimeldura Janaka Mendis, Sar (BH)

(73) Assignee: Kwivo, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,045

(22) Filed: Apr. 6, 2020

(65) Prior Publication Data

US 2020/0403894 A1 Dec. 24, 2020

Related U.S. Application Data

(63) Continuation of application No. 15/935,252, filed on Mar. 26, 2018, now Pat. No. 10,616,087, which is a
(Continued)

(51) Int. Cl.
*G06F 15/16* (2006.01)
*H04L 12/26* (2006.01)
(Continued)

(52) U.S. Cl.
CPC ...... *H04L 43/0876* (2013.01); *B64D 11/0015* (2013.01); *B64D 11/00155* (2014.12);
(Continued)

(58) Field of Classification Search
CPC ........................................................ H04L 12/26
(Continued)

(56) References Cited

U.S. PATENT DOCUMENTS

| 4,352,200 A | 9/1982 | Oxman |
| 5,006,985 A | 4/1991 | Ehret |

(Continued)

OTHER PUBLICATIONS

"Hawaiian Airlines Launches Redesigned 'Mea Ho'okipa Service'", unknown author, Trade Journal, Coventry, United Kingdom, Aug. 7, 2012, 2 pages.
(Continued)

*Primary Examiner* — Jude Jean Gilles
(74) *Attorney, Agent, or Firm* — Sheppard Mullin Richter & Hampton LLP

(57) ABSTRACT

An approach to facilitating in-vehicle services through attendant devices, user-provided devices, and/or an in-vehicle computer system is provided. In one implementation, one or more communication sessions with the in-vehicle computer system may be facilitated by an attendant device. Passenger information relating to one or more passengers of a vehicle and service information relating to one or more services to be provided to the one or more passengers may be obtained by the attendant device from the in-vehicle computer system via the one or more communication sessions. The passenger information and the service information may be provided by the attendant device. An indication that at least one service is in progress or is complete is received by the attendant device.

18 Claims, 7 Drawing Sheets

Related U.S. Application Data continuation of application No. 15/435,404, filed on Feb. 17, 2017, now Pat. No. 9,929,927, which is a continuation of application No. 14/954,962, filed on Nov. 30, 2015, now Pat. No. 9,577,907, which is a continuation of application No. 14/293,623, filed on Jun. 2, 2014, now Pat. No. 9,203,721, which is a continuation of application No. 13/843,990, filed on Mar. 15, 2013, now Pat. No. 8,751,646.

(51) Int. Cl.
| | | |
|---|---|---|
| *H04W 4/48* | (2018.01) | |
| *B64D 11/00* | (2006.01) | |
| *H04L 29/08* | (2006.01) | |
| *H04W 4/42* | (2018.01) | |
| *G06Q 10/00* | (2012.01) | |
| *G06Q 50/00* | (2012.01) | |

(52) U.S. Cl.
CPC ............ *H04L 67/104* (2013.01); *H04L 67/12* (2013.01); *H04W 4/42* (2018.02); *H04W 4/48* (2018.02); *Y02T 50/40* (2013.01)

(58) Field of Classification Search
USPC ................. 709/224, 219, 204, 217
See application file for complete search history.

(56) References Cited

U.S. PATENT DOCUMENTS

| | | | |
|---|---|---|---|
| 5,445,287 A | 8/1995 | Center | |
| 5,808,661 A * | 9/1998 | Infiesto | H04N 7/181 348/14.01 |
| 5,880,867 A | 3/1999 | Ronald | |
| 5,959,596 A | 9/1999 | McCarten | |
| 6,094,640 A | 7/2000 | Goheen | |
| 6,445,287 B1 | 9/2002 | Schofield | |
| 6,499,027 B1 | 12/2002 | Weinberger | |
| 6,509,829 B1 | 1/2003 | Tuttle | |
| 6,559,812 B1 | 5/2003 | McCarten | |
| 6,650,897 B2 | 11/2003 | Nelson | |
| 6,810,527 B1 | 10/2004 | Conrad | |
| 6,813,777 B1 | 11/2004 | Weinberger | |
| 6,957,772 B1 | 10/2005 | Green | |
| 6,973,479 B2 | 12/2005 | Brady | |
| 7,177,638 B2 | 2/2007 | Funderburk | |
| 7,280,825 B2 | 10/2007 | Keen | |
| 7,313,476 B2 | 12/2007 | Nichols | |
| 7,319,854 B2 | 1/2008 | Vondoenhoff | |
| 7,505,736 B2 | 3/2009 | Min | |
| 7,535,367 B2 | 5/2009 | Ratnakar | |
| 7,675,849 B2 | 3/2010 | Watson | |
| 7,725,569 B2 | 5/2010 | Brady | |
| 7,945,934 B2 | 5/2011 | Margis | |
| 7,984,190 B2 | 7/2011 | Rhoads | |
| 8,037,500 B2 | 10/2011 | Margis | |
| 8,103,211 B1 | 1/2012 | Fujisaki | |
| 8,180,678 B2 | 5/2012 | Brotherston | |
| 8,283,801 B2 | 10/2012 | Petitpierre | |
| 8,315,762 B2 | 11/2012 | Correa | |
| 8,322,723 B1 | 12/2012 | Bancel | |
| 8,328,094 B2 | 12/2012 | Proud | |
| 8,488,522 B2 | 7/2013 | Falchuk | |
| 8,495,239 B2 | 7/2013 | Cohen | |
| 8,719,064 B1 | 5/2014 | Heron | |
| 8,744,926 B1 | 6/2014 | Heron | |
| 8,751,646 B1 * | 6/2014 | Heron | H04W 4/48 709/224 |
| 8,972,598 B2 | 3/2015 | Heron | |
| 9,203,721 B2 | 12/2015 | Heron | |
| 9,577,907 B2 | 2/2017 | Heron | |
| 9,929,927 B2 | 3/2018 | Heron | |
| 10,616,087 B2 * | 4/2020 | Heron | B64D 11/00155 |
| 2002/0010633 A1 | 1/2002 | Brotherston | |
| 2002/0059614 A1 | 5/2002 | Lipsanen | |
| 2002/0100803 A1 | 8/2002 | Sehr | |
| 2002/0107916 A1 | 8/2002 | Nii | |
| 2002/0109647 A1 | 8/2002 | Crandall | |
| 2002/0170060 A1 | 11/2002 | Lyman | |
| 2003/0046438 A1 | 3/2003 | O'Donnell | |
| 2003/0046701 A1 | 3/2003 | O'Donnell | |
| 2003/0084451 A1 | 5/2003 | Pierzga | |
| 2003/0093798 A1 | 5/2003 | Rogerson | |
| 2003/0208579 A1 | 11/2003 | Brady | |
| 2004/0039617 A1 | 2/2004 | Maycotte | |
| 2005/0056696 A1 | 3/2005 | Green | |
| 2005/0091086 A1 | 4/2005 | Moore | |
| 2005/0132407 A1 | 6/2005 | Boyer | |
| 2005/0192741 A1 | 9/2005 | Nichols | |
| 2006/0010438 A1 | 1/2006 | Brady | |
| 2006/0032979 A1 * | 2/2006 | Mitchell | B64D 11/00155 244/118.6 |
| 2006/0040612 A1 | 2/2006 | Min | |
| 2006/0055532 A1 | 3/2006 | Li | |
| 2006/0109107 A1 | 5/2006 | Staton | |
| 2006/0163868 A1 | 7/2006 | Baumann | |
| 2007/0097893 A1 | 5/2007 | Rodriguez | |
| 2007/0168205 A1 | 7/2007 | Carlson | |
| 2007/0264999 A1 | 11/2007 | Radpour | |
| 2008/0024270 A1 | 1/2008 | Katagiri | |
| 2008/0121757 A1 | 5/2008 | Pozzi | |
| 2008/0132212 A1 | 6/2008 | Lemond | |
| 2008/0133705 A1 | 6/2008 | Lemond | |
| 2008/0141314 A1 | 6/2008 | Lemond | |
| 2008/0141315 A1 | 6/2008 | Ogilvie | |
| 2008/0219154 A1 | 9/2008 | Durrey | |
| 2008/0221753 A1 | 9/2008 | Kellner | |
| 2008/0270686 A1 | 10/2008 | Grannan | |
| 2009/0094635 A1 | 4/2009 | Aslin | |
| 2009/0112377 A1 | 4/2009 | Schalla | |
| 2009/0133112 A1 | 5/2009 | Kauffman | |
| 2009/0187640 A1 | 7/2009 | Delia | |
| 2009/0279483 A1 | 11/2009 | Falchuk | |
| 2010/0070376 A1 | 3/2010 | Proud | |
| 2010/0070565 A1 | 3/2010 | LeBlanc | |
| 2010/0138582 A1 | 6/2010 | Bird | |
| 2010/0162325 A1 | 6/2010 | Bonar | |
| 2010/0216401 A1 | 8/2010 | Kitahara | |
| 2010/0299207 A1 * | 11/2010 | Harlev | G06Q 30/06 705/14.62 |
| 2011/0107377 A1 | 5/2011 | Petrisor | |
| 2011/0196754 A1 | 8/2011 | Proud | |
| 2011/0264474 A1 | 10/2011 | Lefkowitz | |
| 2012/0004804 A1 | 1/2012 | Beams | |
| 2012/0030708 A1 | 2/2012 | Margis | |
| 2012/0071151 A1 * | 3/2012 | Abramson | H04L 67/12 455/418 |
| 2012/0298737 A1 | 11/2012 | Thakar | |
| 2013/0005336 A1 | 1/2013 | Ayotte | |
| 2013/0117338 A1 | 5/2013 | Lynch | |
| 2013/0139269 A1 | 5/2013 | Shaikh | |
| 2013/0149958 A1 | 6/2013 | Davis | |
| 2013/0157687 A1 | 6/2013 | Mori | |
| 2013/0173796 A1 | 7/2013 | Grab | |
| 2014/0068010 A1 | 3/2014 | Nicholson | |
| 2014/0278767 A1 | 9/2014 | Heron | |
| 2014/0279219 A1 | 9/2014 | Heron | |
| 2014/0280491 A1 | 9/2014 | Heron | |
| 2014/0280928 A1 | 9/2014 | Heron | |
| 2015/0170121 A1 | 6/2015 | Heron | |
| 2016/0164763 A1 | 6/2016 | Heron | |

OTHER PUBLICATIONS

Liu et al., "Toward Next-Generation In-Flight Entertainment Systems: A Survey of the State of the Art and Possible Extensions", Advances in Semantic Media Adaptation and Personalization, 2008, pp. 95-111 (9 pages).

Lui-Kwan, "In-Flight Entertainment: The Sky's the Limit", Entertainment Computing, Oct. 2000, pp. 98-101.

(56) References Cited

OTHER PUBLICATIONS

Walker, Ben, "Buy Before You Fly", Caterer & Hotelkeeper, vol. 193, Issue 4329, Sutton, United Kingdom, Jun. 2004, 6 pages.

* cited by examiner

IN-VEHICLE SERVICES THROUGH ATTENDANT DEVICES, USER-PROVIDED DEVICES, AND/OR AN IN-VEHICLE COMPUTER SYSTEM

CROSS-REFERENCE TO RELATED APPLICATIONS

This application is a continuation of U.S. patent application Ser. No. 15/935,252, filed on Mar. 26, 2018, entitled "IN-VEHICLE SERVICES THROUGH ATTENDANT DEVICES, USER-PROVIDED DEVICES, AND/OR AN IN-VEHICLE COMPUTER SYSTEM" (issued as U.S. Pat. No. 10,616,087 on Apr. 7, 2020), which is a continuation of U.S. patent application Ser. No. 15/435,404, filed on Feb. 17, 2017, entitled "IN-VEHICLE SERVICES THROUGH ATTENDANT DEVICES, USER-PROVIDED DEVICES, AND/OR AN IN-VEHICLE COMPUTER SYSTEM" (issued as U.S. Pat. No. 9,929,927 on Mar. 27, 2018), which is a continuation of U.S. patent application Ser. No. 14/954,962, filed on Nov. 30, 2015, entitled "IN-VEHICLE SERVICES THROUGH ATTENDANT DEVICES, USER-PROVIDED DEVICES, AND/OR AN IN-VEHICLE COMPUTER SYSTEM" (issued as U.S. Pat. No. 9,577,907 on Feb. 21, 2017), which is a continuation of U.S. patent application Ser. No. 14/293,623, filed on Jun. 2, 2014, entitled "IN-VEHICLE SERVICES THROUGH ATTENDANT DEVICES, USER-PROVIDED DEVICES, AND/OR AN IN-VEHICLE COMPUTER SYSTEM" (issued as U.S. Pat. No. 9,203,721 on Dec. 1, 2015), which is a continuation of U.S. patent application Ser. No. 13/843,990, filed on Mar. 15, 2013, entitled "IN-VEHICLE SERVICES THROUGH ATTENDANT DEVICES, USER-PROVIDED DEVICES, AND/OR AN IN-VEHICLE COMPUTER SYSTEM" (issued as U.S. Pat. No. 8,751,646 on Jun. 10, 2014), which is related to U.S. patent application Ser. No. 13/843,864, filed Mar. 15, 2013, entitled "IN-VEHICLE SERVICES FOR USER-PROVIDED DEVICES" (issued Mar. 3, 2015 as U.S. Pat. No. 8,972,598), U.S. patent application Ser. No. 13/844,089, filed on Mar. 15, 2013, entitled "PRE-TRANSIT AND POST-TRANSIT FACILITATION OF IN-VEHICLE SERVICES" (issued Jun. 3, 2014 as U.S. Pat. No. 8,744,926), and U.S. patent application Ser. No. 13/844,169, filed Mar. 15, 2013, entitled "ADMINISTRATION AND CUSTOMIZATION PLATFORM FOR IN-VEHICLE-SERVICES" (issued May 6, 2014 as U.S. Pat. No. 8,719,064), the contents of which are hereby incorporated herein by reference in their entirety.

FIELD OF THE DISCLOSURE

This disclosure relates generally to facilitating in-vehicle services through attendant devices, which may be provided to, or owned and brought onto a vehicle, by an attendant, user-provided devices that may be owned and brought onto the vehicle by a user, and/or an in-vehicle computer system.

BACKGROUND

Transit providers, such as airlines, bus companies, railway companies, taxi companies, limousine companies, etc., may install in-vehicle service systems in their vehicles to provide in-vehicle services to entertain their passengers, enable attendants to better serve the passengers, and/or otherwise provide enhanced services during transit on the vehicle. In-vehicle services may include provision of electronic content (e.g., movies, games, etc.), beverages, meals, blankets, pillows, headphones, and/or other items or services. For example, commercial airlines oftentimes equip their airplanes with in-flight entertainment (IFE) systems to provide their passengers with entertainment while in-transit to their destinations. However, among other issues, conventional IFE systems are heavy, expensive, complex, and/or behind current consumer electronics technology. For instance, conventional IFE systems require wiring and hardware such as seatback controls, seatback displays, overhead displays, or other devices that add weight to the airplane, which translates into added fuel and other costs to operate a given flight. Furthermore, conventional IFE systems may be locked into using the same hardware for a substantial time due to costs, compatibility, or other issues related to upgrading or replacing such systems.

Many transit providers also have on-board attendants who help to service passengers. However, streamlining services provided by the attendants can be difficult in conventional systems. For example, an airplane typically includes a call button that a passenger activates to request attention. However, apart from an indication of where the call button was activated, the attendant is not informed of additional information related to the request. Furthermore, although attendants may access a passenger manifest, the manifest is conventionally decoupled from in-vehicle service systems, thereby failing to leverage information known about passengers and services that can be (or have been) provided by the in-vehicle service system.

SUMMARY

One aspect of the disclosure relates to a system configured to facilitate in-vehicle services through attendant devices, user-provided devices, and/or an in-vehicle computer system, in accordance with one or more implementations. In exemplary implementations, an in-vehicle computer system may facilitate (e.g., establish or accept) one or more communication sessions between one or more attendant devices and user-provided devices. The communication sessions may, for instance, enable the in-vehicle computer system, the attendant devices, and the user-provided devices to interact with one another, for instance, with or without a connection to the Internet or otherwise with or without a connection to a network external to the vehicle.

In some implementations, because a user-provided device may generally be owned by and/or brought aboard the vehicle by a passenger (e.g., user-provided devices may be personal devices of passengers brought on-board to interact with the in-vehicle system), the in-vehicle computer system may identify and associate the user-provided device with an identity and/or seat location of the passenger who brought the user-provided device. In this manner, the in-vehicle computer system may obtain information to identify a passenger making a service request from a user-provided device. For example, the user-provided device may communicate a passenger name, ticket information, and/or other information that may be used to identify the passenger and/or seating location of the passenger.

In some implementations, the in-vehicle computer system may facilitate communication between attendants and passengers on board the vehicle through respective attendant devices and user-provided devices. By way of example, in one implementation, the in-vehicle computer system may enable users to obtain access to entertainment and other services through their user-provided devices along with other benefits.

In some implementations, the system may include the in-vehicle computer system. The in-vehicle computer system may include one or more servers. The server(s) may be configured to communicate with one or more client computing devices according to a client/server architecture and/or other architecture that allows computing devices to communicate with one another. The client computing devices may include one or more of attendance devices and user-provided devices.

The server(s) may be configured to execute one or more computer program modules to facilitate in-vehicle services for user-provided devices. The computer program modules of the servers(s) may include one or more of a communication session module, a content manager module, a passenger module, a service module, a content access module, and/or other modules.

The communication session module may be configured to facilitate one or more communication sessions between one or more attendant devices and one or more user-provided devices.

The passenger module may be configured to provide passenger information relating to one or more passengers. In certain implementations, the passenger module may be configured to provide the passenger information to the one or more attendant devices. By way of example, the passenger information may include one or more of identifying information, preference information, history information, status information, and/or other information associated with the one or more passengers.

The service module may be configured to provide service information relating to one or more services to be provided to the one or more passengers. In various implementations, the service module may provide the service information to the one or more attendant devices.

The service module may be configured to receive at least one request from at least one user-provided device. The service module may be configured to provide the at least one request to the one or more attendant devices. The service module may be configured to receive acknowledgement information associated with the at least one request from at least one attendant device. The service module may be configured to provide the acknowledge information to the at least one user-provided device.

In certain implementations, the service module may be configured to receive an indication that at least one service associated with the at least one request is in progress or complete. In various implementations, the service module may be configured to receive an indication that at least one service associated with the at least one request is complete from at least another attendant device different from the at least one attendant device.

The service module may be configured to provide the indication that the at least one service is complete to the at least one attendant device. In some implementations, the service module may be configured to receive an indication that at least one service associated with the at least one request is complete from the at least one user-provided device. The service module may be configured to provide the indication that the at least one service is complete to the at least one attendant device.

The content access module may be configured to provide access to one or more content items available to one or more user-provided devices. In some implementation, the one or more content items may include at least some content items that are stored by the in-vehicle computer system.

A given attendant device may be configured to execute one or more computer program modules to facilitate in-vehicle services through attendant devices, user-provided devices, and/or an in-vehicle computer system. The computer program modules of the attendant device may include one or more of an attendant communication module, an attendant service module, and/or other modules.

The attendant communication module may be configured facilitate to one or more communication sessions with the in-vehicle computer system.

The attendant service module may be configured to obtain (e.g., receive or take), from the in-vehicle computer system via the one or more communication sessions, passenger information relating to one or more passengers and service information relating to one or more services to be provided to be the one or more passengers.

In certain implementations, the service information may relate to one or more accommodation requests initiated by the one or more passengers. In one implementation, the attendant service module may be configured to obtain the service information responsive to one or more accommodation requests initiated by the one or more passengers at the one or more user-provided devices. In another implementation, the attendant service module may be configured to obtain the service information responsive to one or more accommodation requests initiated by at least one passenger at one or more built-in-vehicle devices such as a call button. In these implementations, the attendant service module may integrate with conventional systems that may be already on-board.

In some implementations, the attendant service module may be configured to obtain the passenger information and the service information from the in-vehicle computer system with or without an Internet connection.

The attendant service module may be configured to provide the passenger information and the service information. In some implementations, the attendant service module may provide the passenger information and the service information to an attendant operating the attendant device, another attendant operating another attendant device, and/or other personnel.

The attendant service module may be configured to receive an indication that at least one service is in progress or is complete. For example, the attendant service module may be configured to receive the indication from the attendant device (that includes the attendant service module), from another attendant device, from a given user-provided device, and/or from other sources such as external computing systems that may already be on-board.

In certain implementations, the attendant service module may be configured to provide a communication relating to servicing the one or more passengers to one or more user-provided devices associated with the one or more passengers. In various implementations, the attendant service module may provide the communication such that one or more of voice communications, video communications, or text communications that are inputted at the attendant device are provided to the one or more user-provided devices. In some implementations, the attendant service module may provide the communication such that one or more of emergency information or safety-related instructions is provided to the one or more user-provided devices.

In various implementations, the attendant communication module may be configured to facilitate one or more direct peer-to-peer communication sessions with the one or more user-provided devices. In some implementations, the attendant service module may be configured to provide the communication via the one or more direct peer-to-peer communication sessions.

In certain implementations, the attendant service module may be configured to receive one or more passenger communications from one or more user-provided devices associated with the one or more passengers. In some implementations, the attendant service module may be configured to receive the one or more passenger communications such that one or more of voice communications, video communications, text communications, and/or other types of communications that are inputted at the one or more user-provided devices are received.

A given user-provided device may be configured to execute one or more computer program modules to facilitate in-vehicle services through attendant devices, user-provided devices, an in-vehicle computer system, and/or other devices. The computer program modules of the user-provided device may include one or more of a user communication module, a user service module, and/or other modules.

The user communication module may be configured to facilitate one or more communication sessions with the in-vehicle computer system.

The user service module may be configured to provide one or more options relating to in-vehicle services available to the user during transit on the vehicle. The user service module may be configured to determine a selection of at least one option by the user. The user service module may be configured to provide, via the one or more communication sessions, the selection of the at least one option to the in-vehicle computer system.

In certain implementations, the user service module may be configured to provide the selection of the at least one option to the in-vehicle computer system with or without an Internet connection.

In some implementations, the user service module may be configured to provide the selection of the at least one option to the in-vehicle computer system such that one or more accommodation requests are provided to the in-vehicle computer system based on the selection.

In certain implementations, the user service module may be configured to receive a list of one or more content items stored by the in-vehicle computer system that are available to the user-provided device. The user service module may be configured to provide the one or more options (relating to in-vehicle services) based on the received list. The user service module may be configured to provide the selection of the at least one option to the in-vehicle computer system such that a selection of at least one content item is provided to the in-vehicle computer system. In some implementations, the user service module may be configured to receive access to the at least one content item via the one or more communication sessions based on the selection of the at least one content item.

In various implementations, the user service module may be configured to receive a communication relating to servicing the user. In some implementations, the user service module may receive the communication such that one or more of emergency information or safety-related instructions are received.

In certain implementations, the user communication module may be configured to facilitate one or more direct peer-to-peer communication sessions with one or more attendant devices. In some implementations, the user service module may be configured to receive the communication from the one or more attendant devices via the one or more direct peer-to-peer communication sessions.

In various implementations, the user service module may be configured to provide one or more passenger communications to one or more attendant devices 104. In some implementations, the user service module may be configured to provide the one or more passenger communications such that one or more of voice communications, video communications, text communications, and/or other types of communications that are inputted at the user-provided device to the one or more attendant devices.

In various implementations, the user service module may be configured to determine that that the user has a frequent flyer status. In some implementations, the one or more options (relating to in-vehicle services) may be provided such that a set of options relating to in-vehicle services that are not available to users without the frequent flyer status may be provided.

In certain implementations, the user service module may be configured to facilitate a check-in of the user for transport of the user. In some implementations, the check-in of the user may be facilitated though the in-vehicle computer system or through one or more computer systems external to the vehicle.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
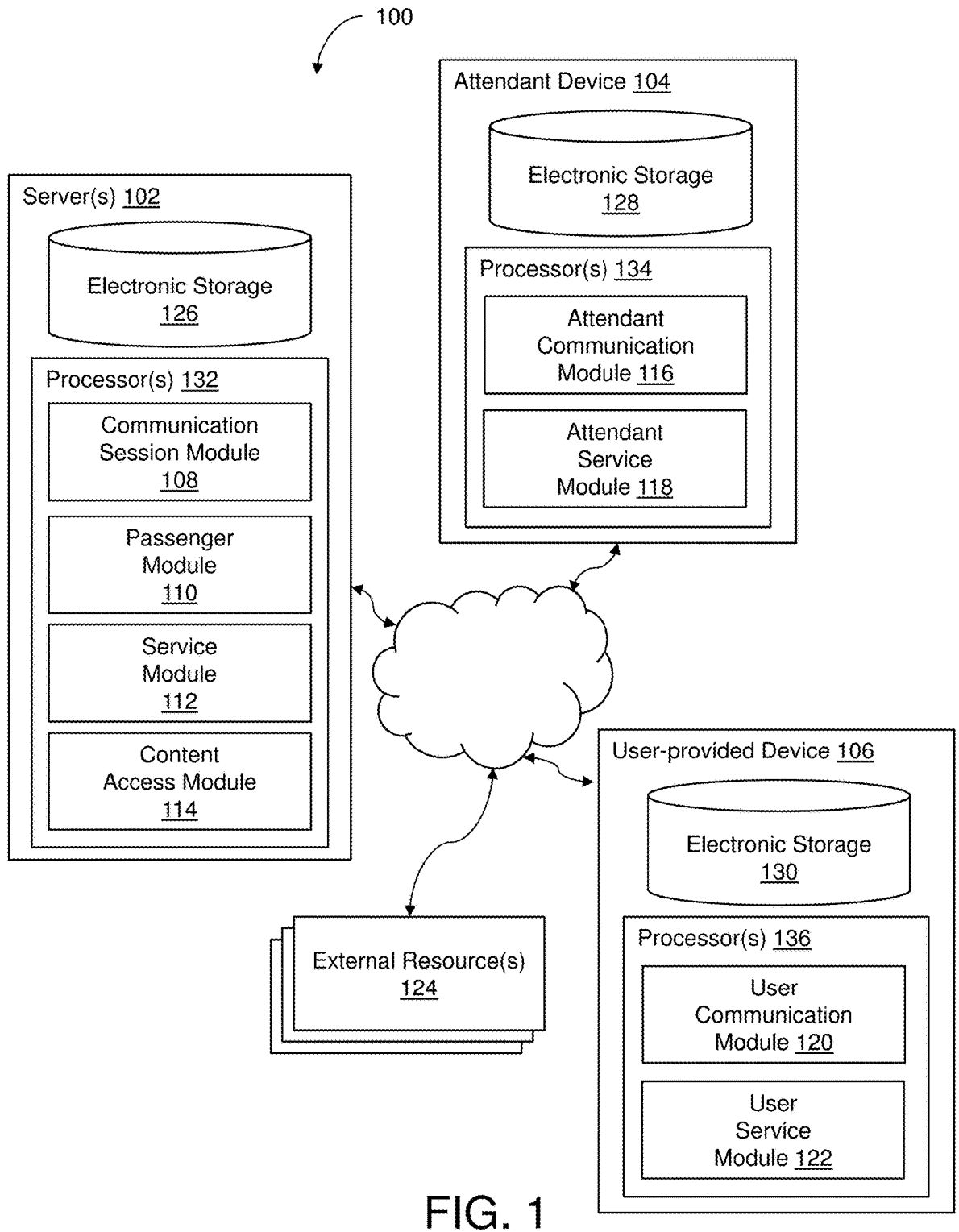
FIG. 1 illustrates a system configured to facilitate in-vehicle services through attendant devices, user-provided devices, and/or an in-vehicle computer system, in accordance with one or more implementations.

FIG. 1 illustrates a system 100 configured to facilitate in-vehicle services through attendant devices, user-provided devices, and/or an in-vehicle computer system, in accordance with one or more implementations. In some implementations, system 100 may include an in-vehicle computer system. The in-vehicle computer system may include one or more servers 102. The server(s) 102 may be configured to communicate with one or more client computing devices according to a client/server architecture. The client computing devices may include one or more attendant devices 104 and one or more user-provided devices 106.

As used herein, an attendant device 104 is provided by an attendant for transit on a vehicle. The attendant device 104 may include applications for in-vehicle services as well as other user applications unrelated to the in-vehicle services. In some implementations, the attendant device 104 is not a dedicated device for exclusive use with the in-vehicle computer system. By way of example, the one or more attendant devices 104 may include one or more of laptop computers, tablet computers, netbooks, smartphones, or other computing devices that are provided by one or more attendants during transit on a vehicle. Attendant devices 104 may, for instance, include the personal devices of the attendants or company-owned devices (e.g., based on whether a company follows a "bring your own device" (BYOD) policy, a hybrid BYOD policy, or other policy). In one scenario, airlines that utilize the in-vehicle computer system of the system 100 may avoid or otherwise reduce costs associated with purchasing, installing, or maintaining attendant equipment because their attendants may bring their own generally-applicable devices that are specially programmed to interact with the in-vehicle computer system.

As used herein, a user-provided device 106 is provided by a user during transit on a vehicle. User-provided device 106 may include applications for in-vehicle services as well as other user applications unrelated to the in-vehicle services. In some implementations, user-provided device 106 is not a dedicated device for exclusive use with the in-vehicle computer system. By way of example, the one or more user-provided devices 106 may include one or more of laptop computers, tablet computers, netbooks, smartphones, or other computing devices that are provided by one or more users during transit on a vehicle. These users may, for instance, include one or more passengers on the vehicle. In one scenario, airlines that utilize the in-vehicle computer system may avoid or otherwise reduce costs associated with purchasing, installing, or maintaining user equipment because their passengers may bring their own generally-applicable devices specifically programmed to interact with the in-vehicle computer system, as well as reduce the weight to a vehicle added by conventional systems.

Server(s) 102 may be configured to execute one or more computer program modules to facilitate in-vehicle services through attendant devices, user-provided devices, and/or an in-vehicle computer system. The computer program modules may include one or more of a communication session module 108, a passenger module 110, a service module 112, a content access module 114, and/or other modules.

Communication session module 108 may be configured to facilitate one or more communication sessions between one or more attendant devices 104 and one or more user-provided devices 106. In some implementations, the one or more communication sessions that are established between the one or more attendant devices 104 and the one or more user-provided devices 106 may enable the one or more attendant devices 104 to provide information to or receive information from the one or more user-provided devices 106 without a connection to a network external to the vehicle (e.g., the Internet) by facilitating the transport of the information between the one or more attendant devices 104 and the one or more user-provided devices 106 via the one or more communication sessions.

Figure 2:
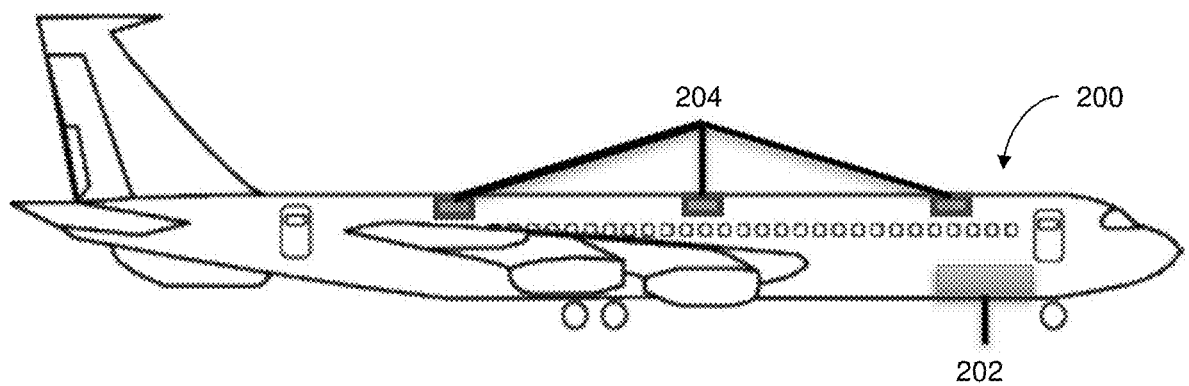
FIG. 2 illustrates a diagram of an in-vehicle computer system on a vehicle, in accordance with one or more implementations.

For example, FIG. 2 illustrates a diagram of an in-vehicle computer system 200 on a vehicle (e.g., a plane), in accordance with one or more implementations. As shown, in-vehicle computer system 200 includes an electronic equipment (EE) bay 202 and wireless access points (WAPs) 204. EE bay 202 may include server(s) 102 having electronic storage 126 in which one or more content items (e.g., for access by the one or more user-provided devices 106) are stored. The stored content items may include documents, songs, video clips, audio books, e-books, games, applications, or other content items. To facilitate interactions between the one or more attendant devices 104 and the one or more user-provided devices 106, in-vehicle computer system 200 may utilize WAPs 204 to facilitate the one or more communication sessions between the one or more attendant devices 104 and the one or more user-provided devices 106.

Referring back to FIG. 1, passenger module 110 may be configured to provide passenger information relating to one or more passengers. In certain implementations, passenger module 110 may be configured to provide the passenger information to the one or more attendant devices 104. By way of example, the passenger information may include one or more of identifying information, preference information, history information, or status information associated with the one or more passengers. Identifying information may include a name of a passenger, an account identifier associated with the passenger, an address of the passenger, or other information that can be used to identify the passenger. Preference information may indicate content items that the passenger may like/dislike, accommodations that the passenger may like/dislike (e.g., assistance, service items, food, beverages, lodging, etc.), or other preferences associated with the passenger. History information may indicate content items that the passenger has previously consumed, accommodations that the passenger has previously requested, traveling history, or other previous events associated with the passenger. Status information may indicate a seat class status (e.g., business class, economy class, etc.), a frequent flyer status, or other statuses associated with the passenger.

In one use case, for instance, the preference information, the history information, the status information, and/or other information that are provided to attendant devices 104 may be enable attendants to customize the transit experience for the passengers on board the vehicle. Attendants may, for instance, offer non-complimentary service items (e.g., blankets, headphones, etc.) to passengers that have paid for those types of service items during previous trips without the passengers having to first initiate a request for those service items. In this way, for instance, attendants may utilize the passenger information to upsell or otherwise provide services items, food, beverages, or other accommodations. Further details and examples with respect to passenger information are described below.

In some implementations, passenger module 110 may be configured to obtain the passenger information via an Internet connection or otherwise a connection to a network external to the vehicle. Passenger module 110 may be configured to store the passenger information at the in-vehicle computer system responsive to obtaining the passenger information. In one implementation, passenger module 110 may be configured to obtain the passenger information prior to boarding of the one or more passengers, prior to starting a trip to a destination (e.g., take-off of a plane), prior to some other event, and/or at other times. In this way, the passenger module 110 may provide the passenger information to the attendant devices 104 or the user-provided devices 106 during transit of the vehicle quickly through the in-vehicle computer system (e.g., the one or more communication sessions) when requested by the attendant devices 104 or the user-provided devices 106, for instance, without relying on a connection to the Internet or otherwise a connection to an external network.

Service module 112 may be configured to provide service information relating to one or more services to be provided to the one or more passengers. In various implementations, service module 112 may provide the service information to the one or more attendant devices 104. As an example, the service information may, for instance, indicate one or more accommodation requests initiated by one or more passengers at built-in-vehicle devices (e.g., a seatback control button, an overhead control button, etc.) or user-provided devices 106.

Figure 3A:
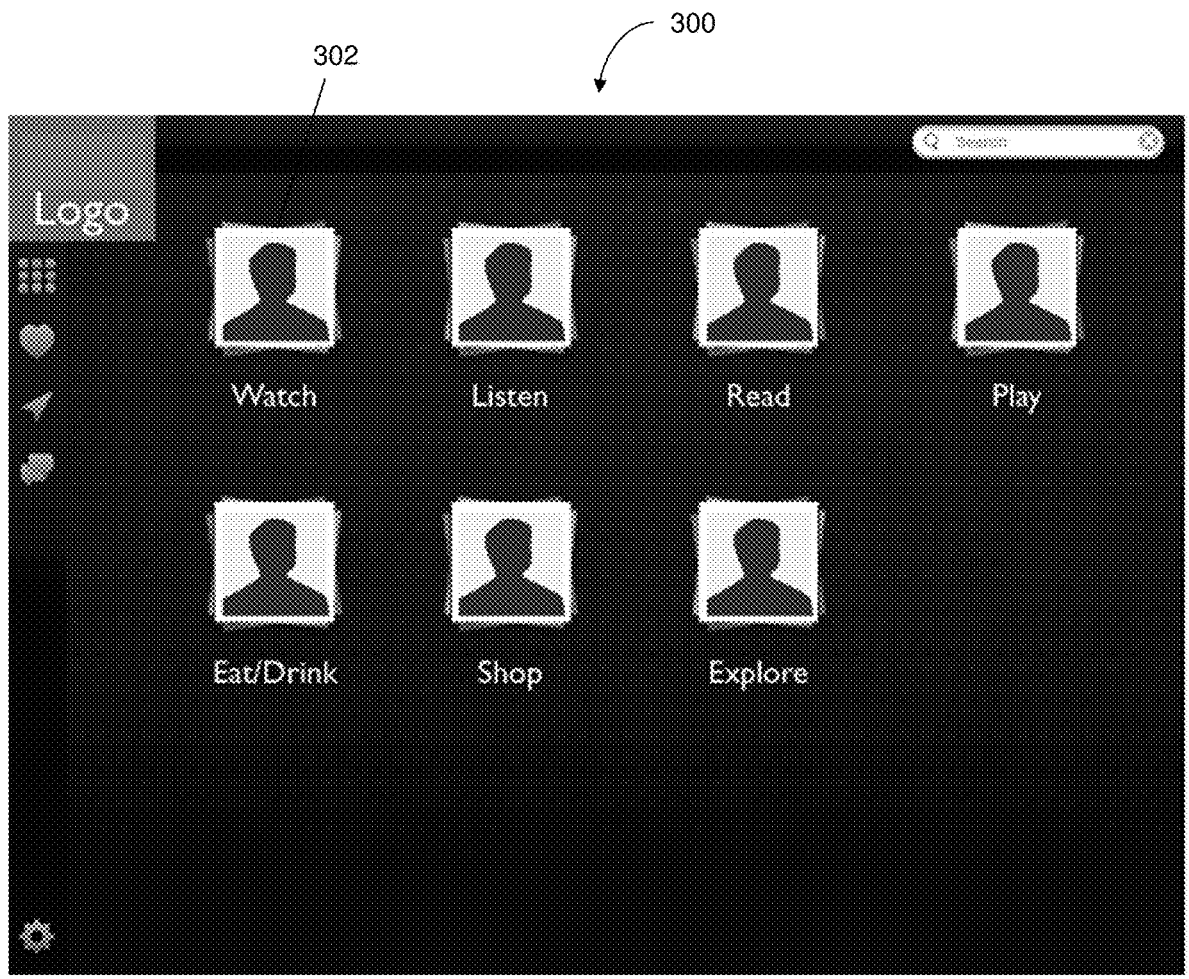
FIGS. 3A and 3B illustrate diagrams of a user interface of an application on a user-provided device for facilitating in-vehicle services, in accordance with one or more implementations.
Figure 3B:
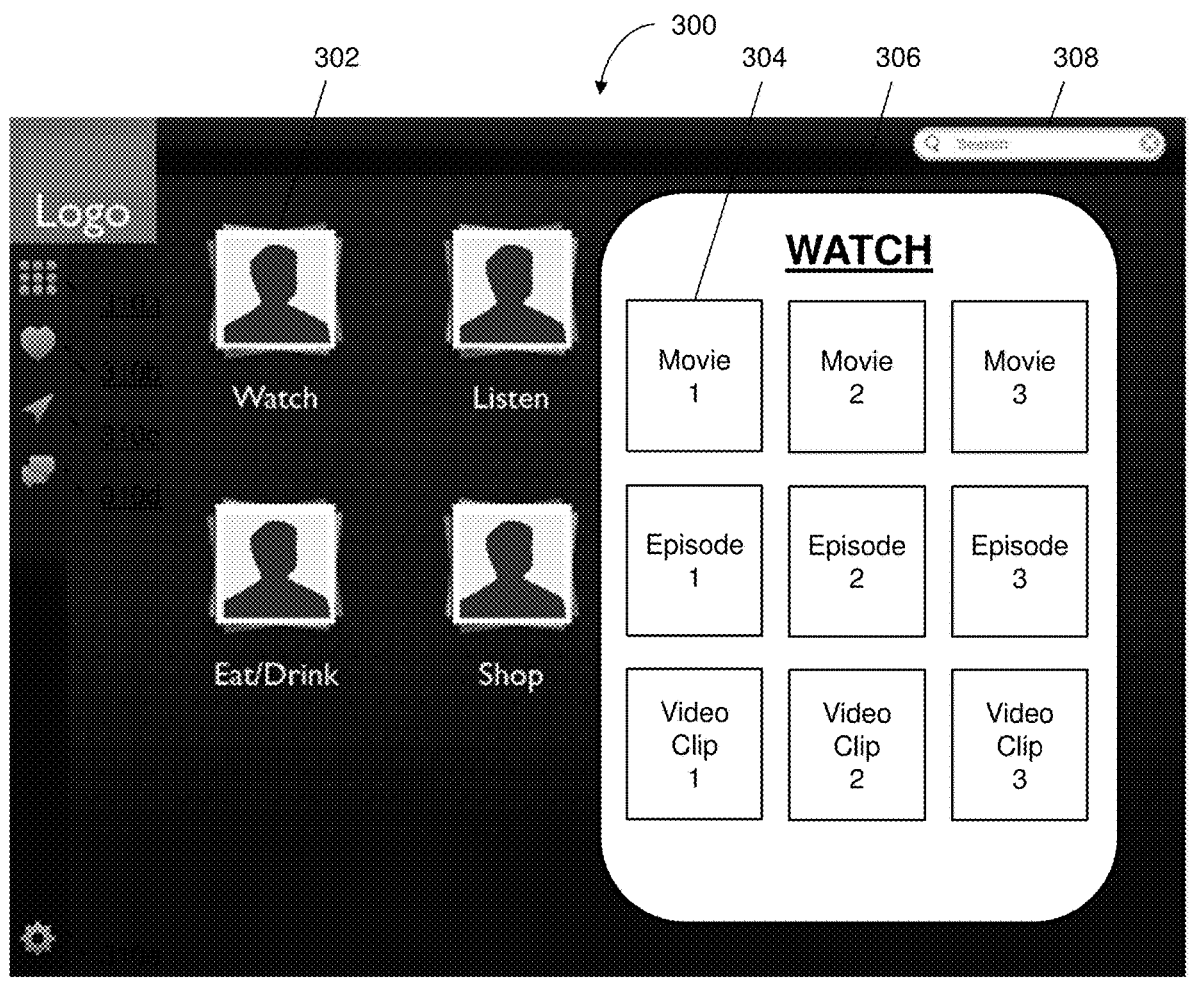

Service module 112 may be configured to receive at least one request from at least one user-provided device 106. Service module 112 may be configured to provide the at least one request to the one or more attendant devices 104. For example, FIGS. 3A and 3B illustrate diagrams of a user interface 300 of an application (e.g., a passenger application) on a user-provided device 106, in accordance with one or more implementations. As shown, with respect to FIG. 3A, user interface 300 includes options 302 (e.g., watch, listen, read, play, eat/drink, shop, explore, etc.) relating to servicing the user of user-provided device 106. In one use case, the user may select the "eat/drink" option 302 to order food/beverages such as a snack, a meal, and/or a beverage. User interface 300 may, for instance, activate a menu for the user to select and order a snack, meal, or beverage. User-provided device 106 may provide the user's selection/order as part of an accommodation request to the in-vehicle computer system. Service module 112 may receive the accommodation request and provide the accommodation request to an attendant device 104 so that an attendant of the attendant device 104 may be notified of the user's selection/order.

Service module 112 may be configured to receive acknowledgement information associated with the at least one request (that is provided to the one or more attendant devices) from at least one attendant device 104. Service module 112 may be configured to provide the acknowledge information to the at least one user-provided device 106. In one scenario, with respect to FIG. 3A, a user-provided device 106 may receive a selection/order of a snack, meal, or beverage that is initiated by a user using user interface 300 (e.g., by selecting the "eat/drink" option 302) and provide the selection/order to the in-vehicle computer system. Service module 112 may provide the selection/order to an attendant device 104 via a push or pull indication mechanism. When an attendant of the attendant device 104 sees the selection/order, the attendant may use attendant device 104 (e.g., via an attendant application) to confirm that he will provide the snack, meal, or beverage to the user of user-provided device 106. The attendant's confirmation of the order may be provided as the acknowledgement information to the in-vehicle computer system. Service module 112 receives the acknowledgement information from attendant device 104 and provides the acknowledgement information to the user-provided device 106 to notify the user that the order is being processed.

In certain implementations, service module 112 may be configured to receive an indication that at least one service associated with the at least one request is in progress or complete. As an example, with respect to the above scenario of FIG. 3A, the acknowledge information (transmitted from the attendant device 104) may include the indication that the user's order is in progress. As another example, with respect to the above scenario of FIG. 3A, the attendant may utilize the attendant application on attendant device 104 to confirm that the user's order is complete after the attendant has provided the ordered snack, meal, or beverage to the user.

In various implementations, service module 112 may be configured to receive an indication that at least one service associated with the at least one request is complete from at least another attendant device different from the at least one attendant device (from which service module 112 received the acknowledgement information). Service module 112 may be configured to provide the indication that the at least one service is complete to the at least one attendant device 104.

Referring to FIG. 3A, for instance, a user-provided device 106 may receive a selection/order of a snack, meal, or beverage that is initiated by a user using user interface 300 (e.g., by selecting the "eat/drink" option 302) and provide the selection/order to the in-vehicle computer system. Service module 112 may provide the selection/order to a first attendant device 104. When a first attendant operating the first attendant device 104 sees the selection/order (e.g., as an attendant task notifying the first attendant of the order), the first attendant may use the first attendant device 104 to acknowledge the order. The first attendant's acknowledgement of the order may be provided as the acknowledgement information to the in-vehicle computer system.

The first attendant may ask a second attendant operating a second attendant device 104 to prepare and provide the ordered snack, meal, or beverage to the user. For example, the first attendant device 104 may assign, forward, or otherwise cause the order to be communicated to the second attendant device 104. The second attendant may utilize the second attendant device 104 to confirm that the user's order is complete after the second attendant has provided the ordered snack, meal, or beverage to the user. Based on the second attendant's confirmation, the second attendant device 104 may provide to the in-vehicle computer system an indication that the user's order is complete. Service module 112 may receive the indication from the second attendant device 104 and provide the indication to the first attendant device 104. When the first attendant device 104 receives the indication, a task that may have initially notified the first attendant of the order may be marked as complete. In this way, attendants may utilize their attendant devices to work together to provide their passengers a better transit experience.

In some implementations, service module 112 may be configured to receive an indication that at least one service associated with the at least one request is complete from the at least one user-provided device 106 (from which service module 112 received the at least one request). Service module 112 may be configured to provide the indication that the at least one service is complete to the at least one attendant device 104.

For example, with respect to the above scenario (with the first and second attendants) of FIG. 3A, when the second attendant has provided the user with the ordered snack, meal, or beverage, the user may utilize the user-provided device 106 to confirm that the user's order has been completed to the user's satisfaction. Based on the user's confirmation, the user-provided device 106 may provide the indication that the order is complete to the in-vehicle computer system. Service module 112 may receive the indication from the user-provided device 106 and provide the indication to the first attendant device 104. When the first attendant device 104 receives the indication, a task that may have initially notified the first attendant of the order may be marked as complete. In this way, the in-vehicle computer system enables users to provide at least some feedback regarding their transit experience to the attendants. The first attendant may, for instance, be a managing attendant, and the user's confirmation that the order is complete may inform the managing attendant that the second attendant has completed the user's order to the user's satisfaction.

Content access module 114 may be configured to provide access to one or more content items available to one or more user-provided devices 106. In some implementations, the one or more content items may include at least some content items that are stored by the in-vehicle computer system. In one scenario, with respect to FIG. 3B, a user may indicate (using her user-provided device 106) that she wants to access content items that may be watched (e.g., by selecting "watch" option 302). As such, the application associated with user interface 300 may send a request for watchable content items 304 to the in-vehicle computer system. In response to receiving the request, service module 112 of the in-vehicle computer system may provide (to the application) a list of watchable content items 304 that may be streamed or downloaded by the user. As such, the application may cause user interface 300 to present a window 306 that includes watchable content items 304 based on the provided list.

If, for instance, the user selects "Movie 1," the selection may be received by service module 112. Service module 112 may then forward the selection to content access module 114 to process the selection. After processing the selection, content access module 114 may provide access to the watchable content item 304 associated with "Movie 1" to user-provided device 106 via an established communication session between the in-vehicle computer system and the user-provided device 106. In one use case, content access module 114 may provide the access to the watchable content item 304 by facilitating streaming of the watchable content item 304 to the user-provided device 106. In another use case, content access module 114 may provide the access to the watchable content item 304 by facilitating a download of the watchable content item 304 to the user-provided device 106.

A given attendant device 104 may be configured to execute one or more computer program modules to facilitate in-vehicle services through attendant devices, user-provided devices, and/or an in-vehicle computer system. The computer program modules of the attendant device 104 may include one or more of an attendant communication module 116, an attendant service module 118, and/or other modules.

Attendant communication module 116 may be configured to facilitate one or more communication sessions with the in-vehicle computer system. In some implementations, the one or more communication sessions that are established between the attendant device 104 and the in-vehicle computer system may enable the attendant device 104 to provide information to or receive information from the in-vehicle computer system without a connection to a network external to the vehicle (e.g., the Internet) by facilitating the transport of the information between the attendant device 104 and the in-vehicle computer system via the one or more communication sessions.

Attendant service module 118 may be configured to obtain, from the in-vehicle computer system via the one or more communication sessions, passenger information relating to one or more passengers and service information relating to one or more services to be provided to be the one or more passengers. As discussed, in some implementations, the passenger information may include one or more of preference information, history information, status information, and/or other information associated with the one or more passengers.

By way of example, the preference information, the history information, the status information, and/or other information associated with the one or more passengers may enable attendants to customize the transit experience for the passengers on board the vehicle. In one use case, for instance, attendants may utilize passenger preferences or service consumption history (e.g., a history of requested assistance, service items, food, beverages, lodging, etc.) to upsell or otherwise provide service items, food, or beverages that complement each other with respect to the passenger's taste. In another use case, attendants may utilize status information to provide additional services or special treatment to frequent flyers or passengers having other special statuses.

In certain implementations, the service information may relate to one or more accommodation requests initiated by the one or more passengers. In one implementation, attendant service module 118 may be configured to obtain the service information responsive to one or more accommodation requests initiated by the one or more passengers at the one or more user-provided devices 106. In one scenario, by obtaining the service information, attendant service module 118 may obtain the one or more accommodation requests. These accommodation requests may, for instance, include requests for assistance, service items, food, beverages, lodging, or other accommodations.

In another implementation, attendant service module 118 may be configured to obtain the service information responsive to one or more accommodation requests initiated by at least one passenger at one or more built-in-vehicle devices. In one use case, a passenger may initiate an accommodation request by pushing a call button of an overhead control device that is built into the vehicle. The overhead control device may then provide an indication that some form of assistance is needed by the passenger. In this way, passengers without user-provided devices may still be able to interact with the in-vehicle computer system along with attendant devices 104 to take advantage of the benefits provided by the system 100 (e.g., the in-vehicle computer system, attendant devices 104, user-provided devices 106, etc.).

As indicated, in some implementations, attendant service module 118 may be configured to obtain the passenger information and the service information from the in-vehicle computer system without an Internet connection. For example, the one or more communication sessions that are established between the attendant device 104 and the in-vehicle computer system may enable the attendant device 104 to obtain the passenger information and the service information from the in-vehicle computer system without an Internet connection or otherwise a connection to a network external to the vehicle. Some benefits may, for instance, include reduced data traffic on an existing Internet connection of the in-vehicle computer system along with faster transport of the passenger information or service information by eliminating the time needed to first obtain the passenger information or service information via an external connection.

Attendant service module 118 may be configured to provide the passenger information and the service information. In some implementations, attendant service module 118 may provide the passenger information and the service information to an attendant operating the attendant device 104, another attendant operating another attendant device 104 (e.g., by transmitting the information to the other attendant device), and/or other personnel. With respect to FIG. 3A, for instance, a user-provided device 106 may receive a selection/order of a snack, meal, or beverage that is initiated by a passenger using user interface 300 (e.g., by selecting the "eat/drink" option 302). The user-provided device 106 may provide the selection/order to the in-vehicle computer system. The in-vehicle computer system may then provide relevant passenger information along with the selection/order to the attendant device 104. Attendant service module 118 may provide a presentation of the order and the passenger information on the attendant device 104.

For example, if the passenger's current order includes a beverage, and the passenger has a history of asking for "No Ice" in her beverages, the presentation of the order may indicate that the passenger may not want ice in her beverage. Thus, even if the passenger did not indicate that she did not want ice in her beverage in her current order (e.g., she forgot to indicate that she did not want ice), the attendant of the attendant device 106 may still be notified that the passenger may not want ice in her beverage. As such, the attendant may double check with the passenger before pouring the beverage for the passenger. In this way, in-vehicle services facilitated by the attendant device 104 and/or other components of the system 100 may provide passengers with an enhanced and custom passenger experience.

Attendant service module 118 may be configured to receive an indication that at least one service is in progress or is complete. For example, attendant service module 118 may be configured to receive the indication from the attendant device 104 (that includes the attendant service module 118), from another attendant device 104, or from a given user-provided device 106. In one scenario, with respect to FIG. 3A, a user-provided device 106 may receive a selection/order of a snack, meal, or beverage that is initiated by a passenger using user interface 300 (e.g., by selecting the "eat/drink" option 302). The user-provided device 106 may provide the selection/order to the attendant device 104. In response to receiving the selection/order, attendant service module 118 may create a task associated with the order on the attendant device 104. An attendant operating the attendant device 104 may provide the indication to the attendant device 104 that the order is in progress by confirming that the attendant will take care of the task. Attendant service module 118 may then, for instance, provide the indication that the order is in progress to the in-vehicle computer system, other attendant devices 104, or the user-provided device 106 operated by the passenger to alert other attendants, the passenger, or others that the order is in progress.

In certain implementations, attendant service module 118 may be configured to provide a communication relating to servicing the one or more passengers to one or more user-provided devices 106 associated with the one or more passengers. In various implementations, attendant service module 118 may provide the communication such that one or more of voice communications, video communications, text communications, and/or other types of communications that are inputted at the attendant device 104 are provided to the one or more user-provided devices 106. For example, attendant service module 118 may enable an attendant to voice chat, video chat, or text chat with passengers through the attendant devices 104 to the user-provided devices 106 to clarify accommodation requests with the passengers, answer questions that the passengers may have, or facilitate other in-vehicle services.

In some implementations, attendant service module 118 may provide the communication such that one or more of emergency information or safety-related instructions is provided to the one or more user-provided devices 106. In one scenario, for instance, prior to landing of an airplane, a flight attendant may utilize his attendant device 104 to send a message to the user-provided devices 106 to inform the passengers on board the airplane that all electronic devices must be turned off, that seatbelts must be buckled, that their seats must be placed in an upright seated position, and that all tray tables must be locked to the seats in front of them.

In various implementations, attendant communication module 116 may be configured to facilitate one or more direct peer-to-peer communication sessions with the one or more user-provided devices 106. In some implementations, attendant service module 118 may be configured to provide the communication via the one or more direct peer-to-peer communication sessions. In this way, an attendant may utilize his attendant device 104 to communicate or otherwise interact with one or more user-provided devices 106 without necessarily requiring a connection to the in-vehicle computer system or a connection to a network external to the vehicle. It should be noted that, in some implementations, attendant communication module 116 may be configured to facilitate one or more direct peer-to-peer communication sessions with one or more other attendant devices 104, the one or more user-provided devices 106, or other devices.

In certain implementations, attendant service module 118 may be configured to receive one or more passenger communications from one or more user-provided devices associated with the one or more passengers. In one use case, for instance, attendant service module 118 may receive a communication from a user provided device associated with a passenger. The communication may, for instance, be an indication from the user-provided device that the passenger is experience some form of emergency (e.g., requesting emergency assistance) so that an attendant can quickly proceed to check on the passenger, call an emergency help line, or otherwise assist the passenger in other ways. In some implementations, attendant service module 118 may be configured to receive the one or more passenger communications such that one or more of voice communications, video communications, or text communications that are inputted at the one or more user-provided devices are received. For example, as discussed, attendant service module 118 may enable an attendant to voice chat, video chat, or text chat with passengers through the attendant devices 104 to the user-provided devices 106.

A given user-provided device 106 may be configured to execute one or more computer program modules to facilitate in-vehicle services through attendant devices, user-provided devices, and/or an in-vehicle computer system. The computer program modules of the user-provided device 106 may include one or more of a user communication module 120, a user service module 122, and/or other modules.

User communication module 120 may be configured to facilitate one or more communication sessions with the in-vehicle computer system. In some implementations, the one or more communication sessions that are established between the user-provided device 106 and the in-vehicle computer system may enable the user-provided device 106 to provide information to or receive information from the in-vehicle computer system with or without a connection to a network external to the vehicle (e.g., the Internet) by facilitating the transport of the information between the user-provided device 106 and the in-vehicle computer system via the one or more communication sessions.

User service module 122 may be configured to provide one or more options relating to in-vehicle services available to the user during transit on the vehicle. For example, with respect to FIG. 3A, user service module 122 may provide options 302 on user interface 300 that relate to in-vehicle services that are available to the user (e.g., watch, listen, read, play, eat/drink, shop, explore, etc.). In one use case, for instance, the user may order food or beverages through user interface 300 (e.g., by selecting "eat/drink" option 302). In another use case, the user may obtain content through user interface 300 (e.g., by selecting one or more of "watch," "listen," "read," and "play" options 302).

In one use case, with respect to FIG. 3B, user interface 300 may enable the user to search for content or more service-related options via a search box 308. In another use case, user interface 300 may enable the user to access other options 310 (e.g., home option 310a, favorites option 310b, map/navigation option 310c, chat option 310d, and settings option 310e, etc.) that may include one or more service-related options.

User service module 122 may be configured to determine a selection of at least one option by the user. User service module 112 may be configured to provide, via the one or more communication sessions, the selection of the at least one option to the in-vehicle computer system. With respect to the above scenario of FIG. 3A, for instance, user service module 122 may determine that a selection of one of the options 302 has been made when the user clicks, touches, or otherwise selects one of the options 302 via user interface 300. In response to the determination of the selection, user service module 122 may provide the selection to the in-vehicle computer system for further processing.

In certain implementations, user service module 122 may be configured to provide the selection of the at least one option to the in-vehicle computer system without an Internet connection. For example, the one or more communication sessions that are established between the user-provided device 106 and the in-vehicle computer system may enable the user-provided device 106 to provide the selection to the in-vehicle computer system without an Internet connection or otherwise a connection to a network external to the vehicle.

In some implementations, user service module 122 may be configured to provide the selection of the at least one option to the in-vehicle computer system such that one or more accommodation requests are provided to the in-vehicle computer system based on the selection. In one scenario, with respect to FIG. 3A, user service module 122 may determine a selection/order of a snack, meal, or beverage that is initiated by a user using user interface 300 (e.g., by selecting the "eat/drink" option 302). User service module 122 may then provide the selection/order as an accommodation request for the ordered snack, meal, or beverage to the in-vehicle computer system.

In certain implementations, user service module 122 may be configured to receive a list of one or more content items stored by the in-vehicle computer system that are available to the user-provided device 106. User service module 122 may be configured to provide the one or more options (relating to in-vehicle services) based on the received list. User service module 122 may be configured to provide the selection of the at least one option to the in-vehicle computer system such that a selection of at least one content item is provided to the in-vehicle computer system. In one scenario, with respect to FIG. 3B, a user may indicate (using her user-provided device 106) that she wants to access content items that may be watched (e.g., by selecting "watch" option 302). As such, the application associated with user interface 300 may send a request for watchable content items 304 to the in-vehicle computer system. In response to receiving the request, service module 112 of the in-vehicle computer system may provide (to the application) a list of watchable content items 304 that may be streamed or downloaded by the user. As such, the application may cause user interface 300 to present a window 306 that includes watchable content items 304 based on the provided list. If, for instance, the user selects "Movie 1," user service module 122 may provide an indication of the selection of "Movie 1" to the in-vehicle computer system.

In some implementations, user service module 122 may be configured to receive access to the at least one content item via the one or more communication sessions based on the selection of the at least one content item. Referring to the above scenario (discussing the selection of "Movie 1") of FIG. 3B, for instance, user service module 122 may stream the watchable content item 304 associated with "Movie 1" to present "Movie 1" to the user. In another scenario, user service module 122 may download the watchable content item 304 to the user-provided device 106 to provide "Movie 1" to the user.

In various implementations, user service module 122 may be configured to receive a communication relating to servicing the user. In some implementations, user service module 122 may receive the communication such that one or more of emergency information or safety-related instructions is received. In one scenario, for instance, prior to take-off of an airplane, a flight attendant may utilize his attendant device 104 to send a message to the user-provided devices 106 to inform the passengers on board the airplane that all electronic devices must be turned off, that seatbelts must be buckled, that their seats must be placed in an upright seated position, and that all tray tables must be locked to the seats in front of them.

In certain implementations, user communication module 120 may be configured to facilitate one or more direct peer-to-peer communication sessions with one or more attendant devices 104. In one use case, for instance, a passenger may utilize a user-provided device to initiate a food order to an attendant at an airport gate via an established peer-to-peer communication session with an attendant device while waiting for the plane to arrive. In this way, the passenger may pre-order service (e.g., food, beverages, blankets, etc.) before boarding the plane. In some implementations, user service module 122 may be configured to receive the communication from the one or more attendant devices 104 via the one or more direct peer-to-peer communication sessions. In this way, a passenger may utilize her user-provided device 106 to communicate or otherwise interact with one or more attendant devices 104 without necessarily requiring a connection to the in-vehicle computer system or a connection to a network external to the vehicle. It should be noted that, in some implementations, user communication module 120 may be configured to facilitate one or more direct peer-to-peer communication sessions with one or more other user-provided devices 106, the one or more attendant devices 104, and/or other devices.

In various implementations, user service module 122 may be configured to provide one or more passenger communications to one or more attendant devices 104. In some implementations, user service module 122 may be configured to provide the one or more passenger communications such that one or more of voice communications, video communications, or text communications that are inputted at the user-provided device 106 are provided to the one or more attendant devices 104. For example, as discussed, user service module 122 may enable a passenger to voice chat, video chat, or text chat with passengers through the attendant devices 104 to the user-provided devices 106 to clarify accommodation requests for the attendants, to ask the attendants questions, or initiate requests for other services.

In various implementations, user service module 122 may be configured to determine that that the user has a frequent flyer status. In some implementations, the one or more options (relating to in-vehicle services) may be provided such that a set of options relating to in-vehicle services that are not available to users without the frequent flyer status may be provided. For example, the set of options may be presented on a user interface of an application on the user-provided device 106 as an alternative or additional set of options to a set of options that are typically available to users (e.g., users without the frequent flyer status).

In certain implementations, user service module 122 may be configured to facilitate a check-in of the user for transport of the user. In some implementations, the check-in of the user may be facilitated though the in-vehicle computer system or through one or more computer systems external to the vehicle. In one use case, a particular user may check-in her flight from home prior to arriving at the airport via a "Northeast Airlines" application on her user-provided device 106 that may interact with in-vehicle computer systems of "Northeast Airlines" planes once near or inside those planes. However, while at home, the particular user may nonetheless connect to the Internet via her user-provided device 106 to check-in to her "Northeast Airlines" application.

Server(s) 102, attendant devices 104, user-provided devices 106, external resources 124, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, attendant devices 104, user-provided devices 106, external resources 124, and/or other components may be operatively linked via some other communication media.

External resources 124 may include sources of information, hosts and/or providers outside of system 100, external entities participating with system 100, and/or other resources. In some implementations, some or all of the functionality attributed herein to external resources 124 may be provided by resources included in system 100.

In some implementations, server(s) 102 may include an electronic storage 118, one or more processor(s) 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storages 126, 128, and 130 may comprise electronic storage media that electronically stores information. The electronic storage media of electronic storages 126, 128, and 130 may include one or both of system storage that is provided integrally (i.e., substantially non-removable) with server(s) 102 and/or the client devices (e.g., attendant devices 104, user-provided devices 106, etc.), and/or removable storage that is removably connectable to server(s) 102 and/or the client devices via, for example, a port (e.g., a USB port, a firewire port, etc.) or a drive (e.g., a disk drive, etc.). Electronic storages 126, 128, and 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storages 126, 128, and 130 may include one or more virtual storage resources (e.g., cloud storage, a virtual private network, and/or other virtual storage resources). Electronic storages 126, 128, and 130 may store software algorithms, information determined by processors 132, 134, and 136, information received from server(s) 102, information received from attendant devices 104, information received from user-provided devices 106, information received from external resources 124, and/or other information that enables server(s) 102 or the client devices to function as described herein.

Processors 132, 134, and 136 may be configured to provide information processing capabilities in server(s) 102, attendant device 104, and user-provided device 106, respectively. As such, processors 132, 134, and 136 may include one or more of a digital processor, an analog processor, a digital circuit designed to process information, an analog circuit designed to process information, a state machine, and/or other mechanisms for electronically processing information. Although processors 132, 134, and 136 are shown in FIG. 1 as single entities, this is for illustrative purposes only. In some implementations, each of processors 132, 134, and 136 may include a plurality of processing units. These processing units may be physically located within the same device, or processors 132, 134, and 136 may individually represent processing functionality of a plurality of devices operating in coordination. Processors 132, 134, and 136 may respectively be configured to execute modules 108, 110, 112, 114, 116, 118, 120, 122, and/or other modules by software; hardware; firmware; some combination of software, hardware, and/or firmware; and/or other mechanisms for configuring processing capabilities on processors 132, 134, and 136.

It should be appreciated that although modules 108, 110, 112, and 114 are illustrated in FIG. 1 as being co-located within a single processing unit, in implementations in which processor(s) 132 includes multiple processing units, one or more of modules 108, 110, 112, and/or 114 may be located remotely from the other modules. It should be appreciated although modules 116 and 118 are respectively illustrated in FIG. 1 as being co-located within a single processing unit, in implementations in which processor(s) 134 includes multiple processing units, one or more of modules 116 and/or 118 may be located remotely from the other modules. It should be appreciated that although modules 120 and 122 are respectively illustrated in FIG. 1 as being co-located within a single processing unit, in implementations in which processor(s) 136 includes multiple processing units, one or more of modules 120 and/or 120 may be located remotely from the other modules. The description of the functionality provided by the different modules 108, 110, 112, 114, 116, 118, 120, 122, and/or 124 described below is for illustrative purposes, and is not intended to be limiting, as any of modules 108, 110, 112, 114, 116, 118, 120, 122, and/or 124 may provide more or less functionality than is described. For example, one or more of modules 108, 110, 112, 114, 116, 118, 120, 122, and/or 124 may be eliminated, and some or all of its functionality may be provided by other ones of modules 108, 110, 112, 114, 116, 118, 120, 122, and/or 124. As another example, processors 132, 134, and 136 may individually be configured to execute one or more additional modules that may perform some or all of the functionality attributed below to one of modules 108, 110, 112, 114, 116, 118, 120, 122, and/or 124.

Figure 4:
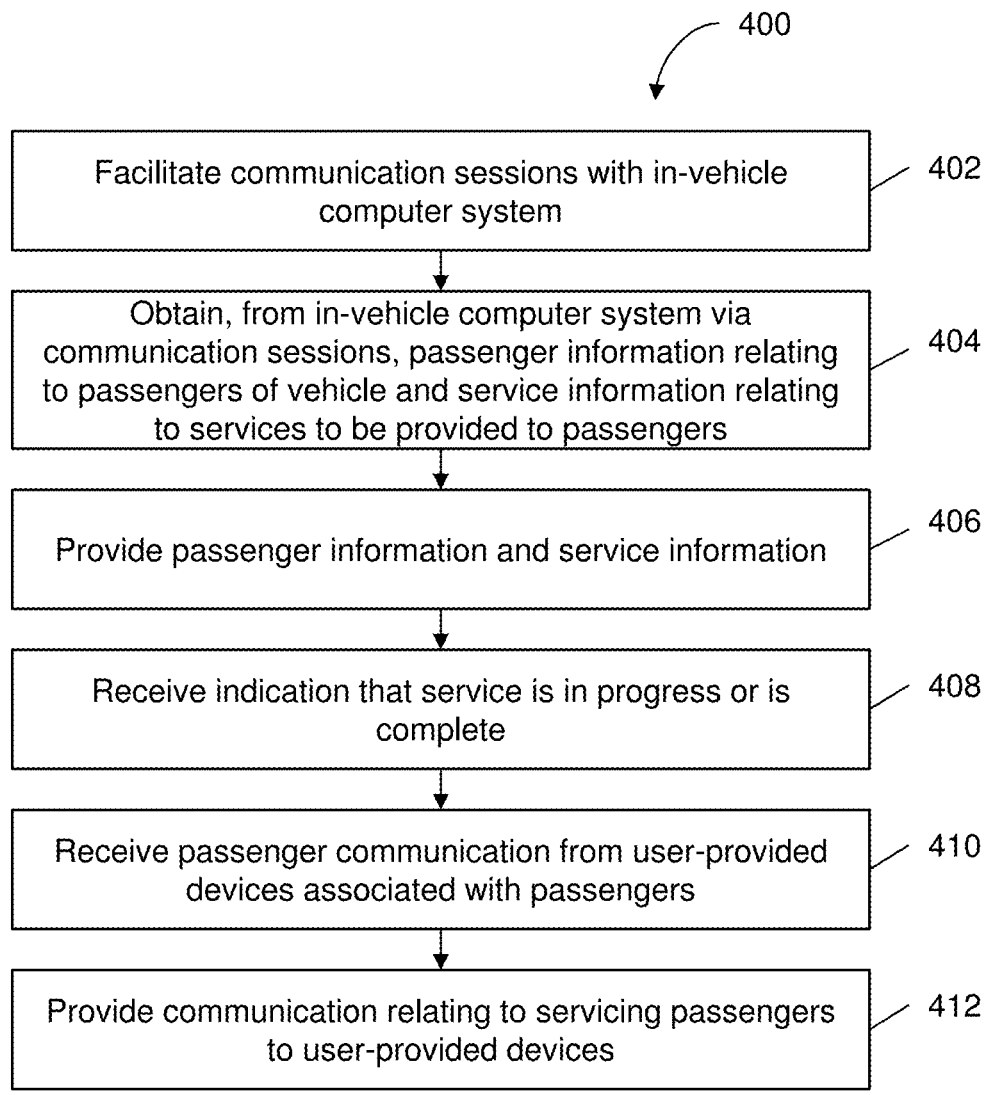
FIG. 4 illustrates a method for provisioning of in-vehicle services through an attendant device that communicates with an in-vehicle computer system of a vehicle or with a user-provided device, in accordance with one or more implementations.

FIG. 4 illustrates a method 400 for provisioning of in-vehicle services through an attendant device that communicates with an in-vehicle computer system of a vehicle or with a user-provided device, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, one or more communication sessions with an in-vehicle computer system may be facilitated. Operation 402 may be performed by an attendant communication module that is the same as or similar to attendant communication module 116, in accordance with one or more implementations.

At an operation 404, passenger information relating to one or more passengers of the vehicle and service information relating to one or more services to be provided to the one or more passengers may be obtained. In one implementation, the passenger information and the service information may be obtained from the in-vehicle computer system without an Internet connection. In another implementation, the passenger information may be obtained such that one or more of preference information, history information, or status information associated with the one or more passengers is obtained from the in-vehicle computer system. In another implementation, the passenger information may be obtained such that status information associated with at least one passenger is obtained. In another implementation, the service information may be obtained responsive to one or more accommodation requests initiated by at least one passenger at one or more built-in-vehicle devices. In another implementation, the service information may be obtained such that one or more accommodation requests initiated by the one or more passengers at the one or more user-provided devices are obtained. Operation 404 may be performed by an attendant service module that is the same as or similar to attendant service module 118, in accordance with one or more implementations.

At an operation 406, the passenger information and the service information may be provided. Operation 406 may be performed by an attendant service module that is the same as or similar to attendant service module 118, in accordance with one or more implementations.

At an operation 408, an indication that at least one service is in progress or is complete may be received. In some implementations, the indication may be received from the in-vehicle computer system, at least another attendant device, or at least one user-provided device. Operation 408 may be performed by an attendant service module that is the same as or similar to attendant service module 118, in accordance with one or more implementations.

At an operation 410, one or more passenger communications may be received from the one or more user-provided device associated with the one or more passengers. In some implementations, the one or more passenger communications may be received such that one or more of voice communications, video communications, or text communications that are inputted at the one or more user-provided devices are received. Operation 410 may be performed by an attendant service module that is the same as or similar to attendant service module 118, in accordance with one or more implementations.

At an operation 412, a communication relating to servicing the one or more passengers may be provided to the one or more user-provided devices. In some implementations, the communication may be provided such that one or more of emergency information or safety-related instructions are provided to the one or more user-provided devices. Operation 412 may be performed by an attendant service module that is the same as or similar to attendant service module 118, in accordance with one or more implementations.

In certain implementations, one or more direct peer-to-peer communication sessions may be facilitated with the one or more user-provided devices. In some implementations, the communication relating to servicing the one or more passengers may be provided to the one or more user-provided devices via the one or more direct peer-to-peer communication sessions. Facilitation of the one or more direct peer-to-peer communication sessions may be performed by an attendant communication module that is the same as or similar to attendant communication module 116, in accordance with one or more implementations.

Figure 5:
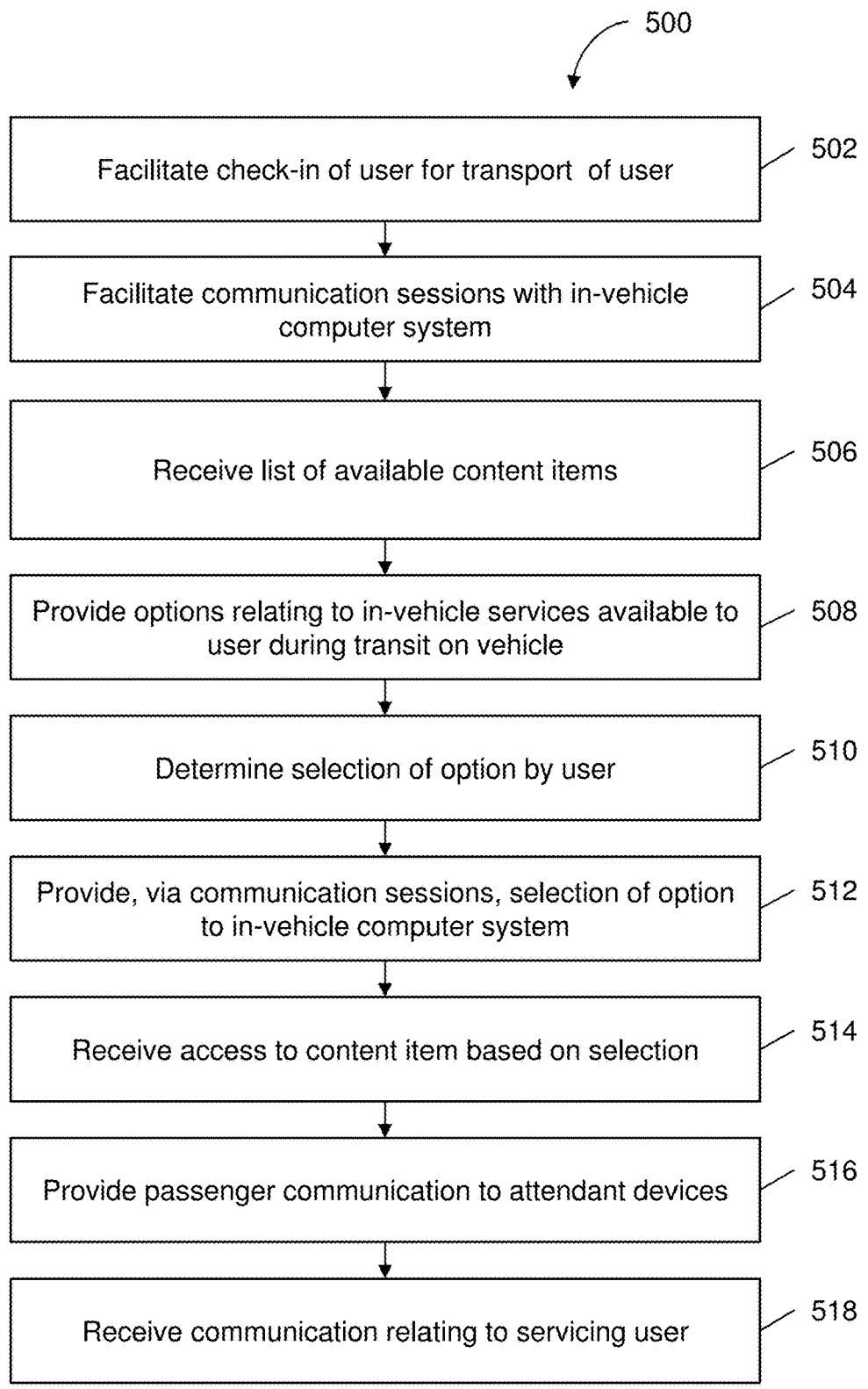
FIG. 5 illustrates a method for obtaining of in-vehicle services through a user-provided device that communicates with an in-vehicle computer system of a vehicle or with an attendant device, in accordance with one or more implementations.

FIG. 5 illustrates a method 500 for obtaining of in-vehicle services through a user-provided device that communicates with an in-vehicle computer system of a vehicle or with an attendant device, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a check-in of the user for transport to be provided by one or more of a company or a group of companies may be facilitated. In some implementations, the check-in of the user may be facilitated though the in-vehicle computer system or through one or more computer systems external to the vehicle. Operation 502 may be performed by a user service module that is the same as or similar to user service module 122, in accordance with one or more implementations.

At an operation 504, one or more communication sessions with an in-vehicle computer system may be facilitated. Operation 504 may be performed by a user communication module that is the same as or similar to user communication module 120, in accordance with one or more implementations.

At an operation 506, a list of one or more available content items may be received. In various implementations, the one or more available content items in the list may include one or more content items available to the user of the user-provided device that are stored by the in-vehicle computer system. In some implementations, the one or more available content items in the list may include one or more content item available to the user of the user-provided device that are not currently stored by the in-vehicle computer system, but are accessible via an Internet connection (e.g., to a third party content store, to a network external to the vehicle, etc.). Operation 506 may be performed by a user service module that is the same as or similar to user service module 122, in accordance with one or more implementations.

At an operation 508, one or more options relating to in-vehicle services available to the user during transit on the vehicle may be provided. For example, the one or more options may be presented on a user interface of an application on the user-provided device. In certain implementations, the one or more options may be provided based on a received list of one or more available content items. Operation 508 may be performed by a user service module that is the same as or similar to user service module 122, in accordance with one or more implementations.

In some implementations, the user may be determined to have a frequent flyer status. In one implementation, the one or more options (relating to in-vehicle services) may be provided such that a set of options relating to in-vehicle services that are not available to users without the frequent flyer status are provided. For example, the set of options may be presented on a user interface of an application on the user-provided device as an alternative or additional set of options to a set of options that are typically available to users (e.g., users without the frequent flyer status). Determination that the user has the frequent flyer status may be performed by a user service module that is the same as or similar to user service module 122, in accordance with one or more implementations.

At an operation 510, a selection of at least one option may be determined. In some implementations, the selection of the at least one option may include a selection of at least one content item. Operation 510 may be performed by a user service module that is the same as or similar to user service module 122, in accordance with one or more implementations.

At an operation 512, the selection of the at least one option may be provided to the in-vehicle computer system via the one or more communication sessions. In certain implementations, the selection of the at least one option may be provided to the in-vehicle computer system without an Internet connection. In some implementations, the at least one option may be related to one or more accommodation requests of the user. The selection of the at least one option may be provided such that the one or more accommodation requests are provided to the in-vehicle computer system. Operation 512 may be performed by a user service module that is the same as or similar to user service module 122, in accordance with one or more implementations.

At an operation 514, access to at least one content item may be received. For example, the selection of the at least one option may include a selection of the at least one content item. The access to the at least one content item may be received based on the selection of the at least one content item. Operation 514 may be performed by a user service module that is the same as or similar to user service module 122, in accordance with one or more implementations.

At an operation 516, one or more passenger communications may be provided to one or more attendant devices. In some implementations, the one or more passenger communications may be provided such that one or more of voice communications, video communications, or text communications that are inputted at the user-provided device is provided to the one or more attendant devices. Operation 516 may be performed by a user service module that is the same as or similar to user service module 122, in accordance with one or more implementations.

At an operation 518, a communication relating to servicing the user may be received. For example, the communication may be received from the attendant device or the in-vehicle computer system. In certain implementations, the communication may be received such that one or more of emergency information or safety-related instructions is received. Operation 518 may be performed by a user service module that is the same as or similar to user service module 122, in accordance with one or more implementations.

In certain implementations, one or more direct peer-to-peer communication sessions may be facilitated with one or more attendant devices. In some implementations, the communication relating to servicing the one or more passengers may be received from the one or more attendant devices via the one or more direct peer-to-peer communication sessions. Facilitation of the one or more direct peer-to-peer communication sessions may be performed by a user communication module that is the same as or similar to user communication module 120, in accordance with one or more implementations.

Figure 6:
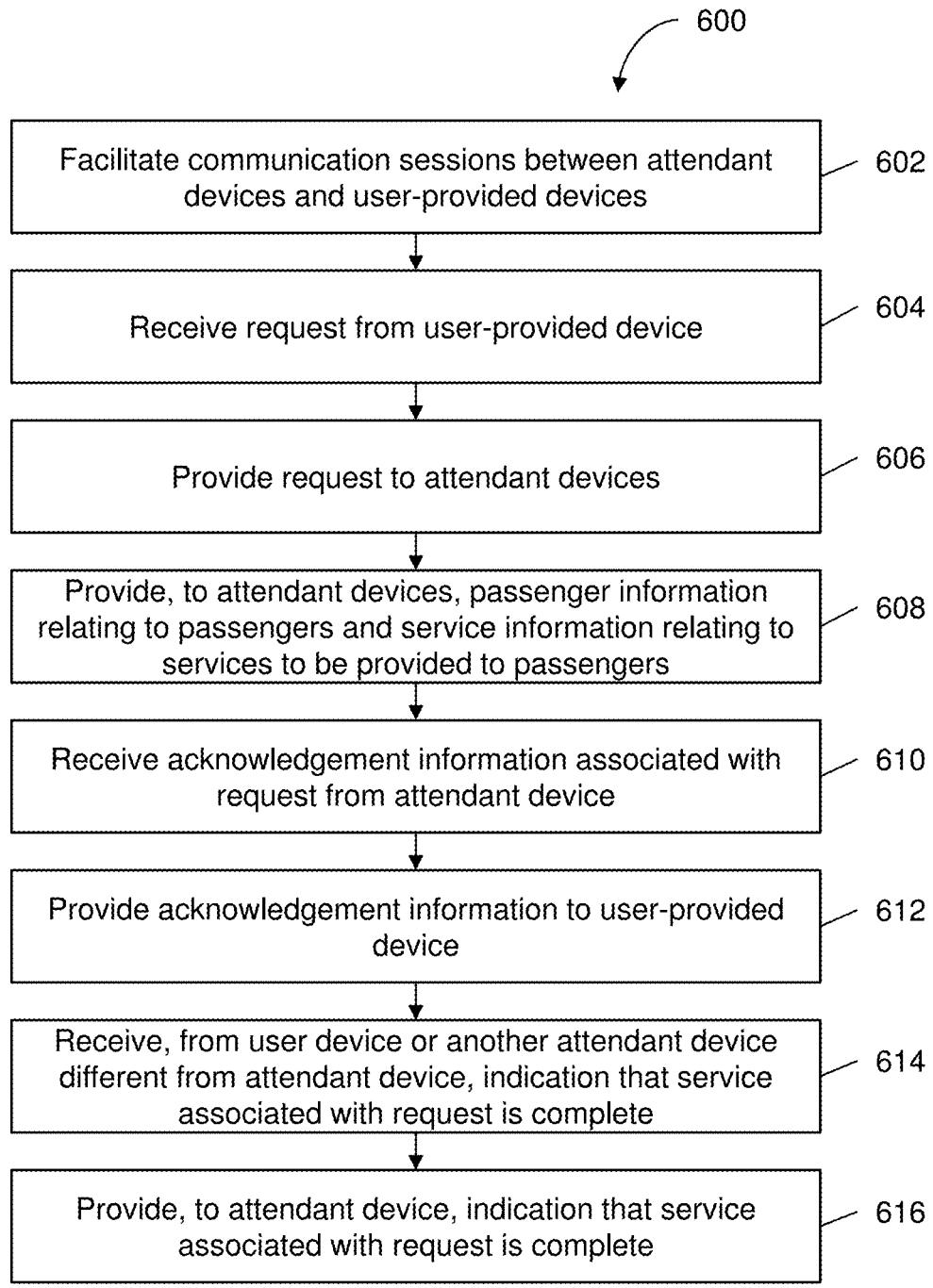
FIG. 6 illustrates a method for in-vehicle services through an in-vehicle computer system of a vehicle that communicates with a user-provided device or with an attendant device, in accordance with one or more implementations.

FIG. 6 illustrates a method 600 for in-vehicle services through an in-vehicle computer system of a vehicle that communicates with a user-provided device or with an attendant device, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, one or more communication sessions between one or more attendant devices and one or more user-provided devices may be facilitated. Operation 602 may be performed by a communication session module that is the same as or similar to communication session module 108, in accordance with one or more implementations.

At an operation 604, at least one request may be received from at least one user-provided device. Operation 604 may be performed by a service module that is the same as or similar to service module 112, in accordance with one or more implementations.

At an operation 606, the at least one request may be provided to the one or more attendant devices. Operation 606 may be performed by a service module that is the same as or similar to service module 112, in accordance with one or more implementations.

At an operation 608, passenger information relating to one or more passengers and service information relating to one or more services to be provided to the one or more passengers may be provided to the one or more attendant devices. In some implementations, the service information may include information relating to at least one service associated with the request. Operation 608 may be performed by a passenger module or a service module that are the same as or similar to passenger module 110 or service module 112, in accordance with one or more implementations.

At an operation 610, acknowledgement information associated with the request may be received from at least one attendant device. Operation 610 may be performed by a service module that is the same as or similar to service module 112, in accordance with one or more implementations.

At an operation 612, the acknowledgement information may be provided to the at least one user-provided device. Operation 612 may be performed by a service module that is the same as or similar to service module 112, in accordance with one or more implementations.

At an operation 614, an indication that at least one service associated with the request is complete may be received. As shown, in some implementations, the indication that the at least one service is complete may be received from the at least one user-provided device or another attendant device that is different from the at least one attendant device (e.g., the at least one attendant device from which the acknowledgement information is received). Operation 614 may be performed by a service module that is the same as or similar to service module 112, in accordance with one or more implementations.

At an operation 616, the indication that the at least one service is complete may be provided to the at least one attendant device (e.g., the at least one attendant device from which the acknowledgement information is received). Operation 616 may be performed by a service module that is the same as or similar to service module 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for facilitating in-flight services through an on-board computer system of an airplane that communicates with one or more passenger-provided devices and with one or more attendant devices, wherein passenger-provided devices on a flight are provided by passengers on that flight, the method being implemented on the on-board computer system that includes one or more physical processors, the method comprising:
    receiving, by the on-board computer system, a request from a passenger-provided device, wherein the request comprises aa seat location and a service associated with the request;
    providing, by the on-board computer system, the request to the one or more attendant devices;
    receiving, by the on-board computer system, acknowledgement information from a first attendant device of the one or more attendant devices, wherein the acknowledgement information comprises an indication that the service associated with the request is in progress or complete.

2. The method of claim 1, the method further comprising: providing, by the on-board computer system to the one or more attendant devices, passenger information relating to the passenger associated with the passenger-provided device and service information indicating one or more services that may be provided to the passenger.

3. The method of claim 2, wherein the passenger information comprises one or more of history information, preference information, or status information associated with the passenger.

4. The method of claim 1, the method further comprising: providing, by the on-board computer system, the acknowledgement information to the passenger-provided device.

5. The method of claim 1, the method further comprising: receiving, by the on-board computer system from a second attendant device of the one or more attendant devices, an indication that the service associated with the request is in progress or complete; and providing, by the on-board computer system to the first attendant device, the indication that the service is in progress or complete.

6. The method of claim 1, the method further comprising: receiving, by the on-board computer system from the passenger-provided device, an indication that the service associated with the request is complete; and providing, by the on-board computer system to the first attendant device, the indication that the service is complete.

7. The method of claim 3, wherein the status information indicates at least one of a seat class status or a frequent flyer status for the passenger.

8. The method of claim 3, wherein the history information is based on one or more of the passenger's previous requests during one or more previous flights taken by the passenger.

9. The method of claim 3, wherein the preference information indicates at least one of a content item that the passenger may like or dislike, or an accommodation that the passenger may like or dislike.

10. An in-flight system for facilitating in-flight services through an on-board computer system of an airplane that communicates with one or more passenger-provided devices and with one or more attendant devices, wherein passenger-provided devices on a flight are provided by passengers on that flight, the system comprising:
    an on-board computer system comprising one or more physical processors programmed with one or more computer-executable instructions that, when executed by the one or more physical processors, cause the on-board computer system to:
- receive a request from a passenger-provided device, wherein the request comprises a seat location and a service associated with the request;
- provide the request to the one or more attendant devices;
- receive acknowledgement information from a first attendant device of the one or more attendant devices, wherein the acknowledgement information comprises an indication that the service associated with the request is in progress or complete.

11. The system of claim 10, wherein the on-board computer system is further programmed to: provide to the one or more attendant devices passenger information relating to the passenger associated with the request and service information indicating one or more services that may be provided to the passenger.

12. The system of claim 11, wherein the passenger information comprises one or more of history information, preference information, or status information associated with the passenger.

13. The system of claim 10, wherein the on-board computer system is further programmed to: provide the acknowledgement information to the passenger-provided device.

14. The system of claim 10, wherein the on-board computer system is further programmed to: receive from a second attendant device of the one or more attendant devices an indication that the service associated with the request is complete; and provide to the first attendant device the indication that the service is complete.

15. The system of claim 10, wherein the on-board computer system is further programmed to: receive from the passenger-provided device an indication that the service associated with the request is complete; and provide to the first attendant device the indication that the service is complete.

16. The system of claim 12, wherein the preference information indicates at least one of a content item that the passenger may like or dislike, or an accommodation that the passenger may like or dislike.

17. The system of claim 12, wherein the status information indicates at least one of a seat class status or a frequent flyer status for the passenger.

18. The system of claim 12, wherein the history information is based on one or more of the passenger's previous requests during one or more previous flights taken by the passenger.

* * * * *

UNITED STATES PATENT AND TRADEMARK OFFICE
CERTIFICATE OF CORRECTION

| | |
|---|---|
| PATENT NO. | : 11,102,101 B2 |
| APPLICATION NO. | : 16/841045 |
| DATED | : August 24, 2021 |
| INVENTOR(S) | : Alexandra Kathleen Heron et al. |

It is certified that error appears in the above-identified patent and that said Letters Patent is hereby corrected as shown below:

In the Claims

Column 24, Line 14, (Claim 1, Line 11), please change "aa" to --a--.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*